Jan. 29, 1957  W. L. VOEGELI  2,779,604
TRACTION BOOSTING SYSTEM FOR TRACTORS
Filed July 11, 1955  4 Sheets-Sheet 3

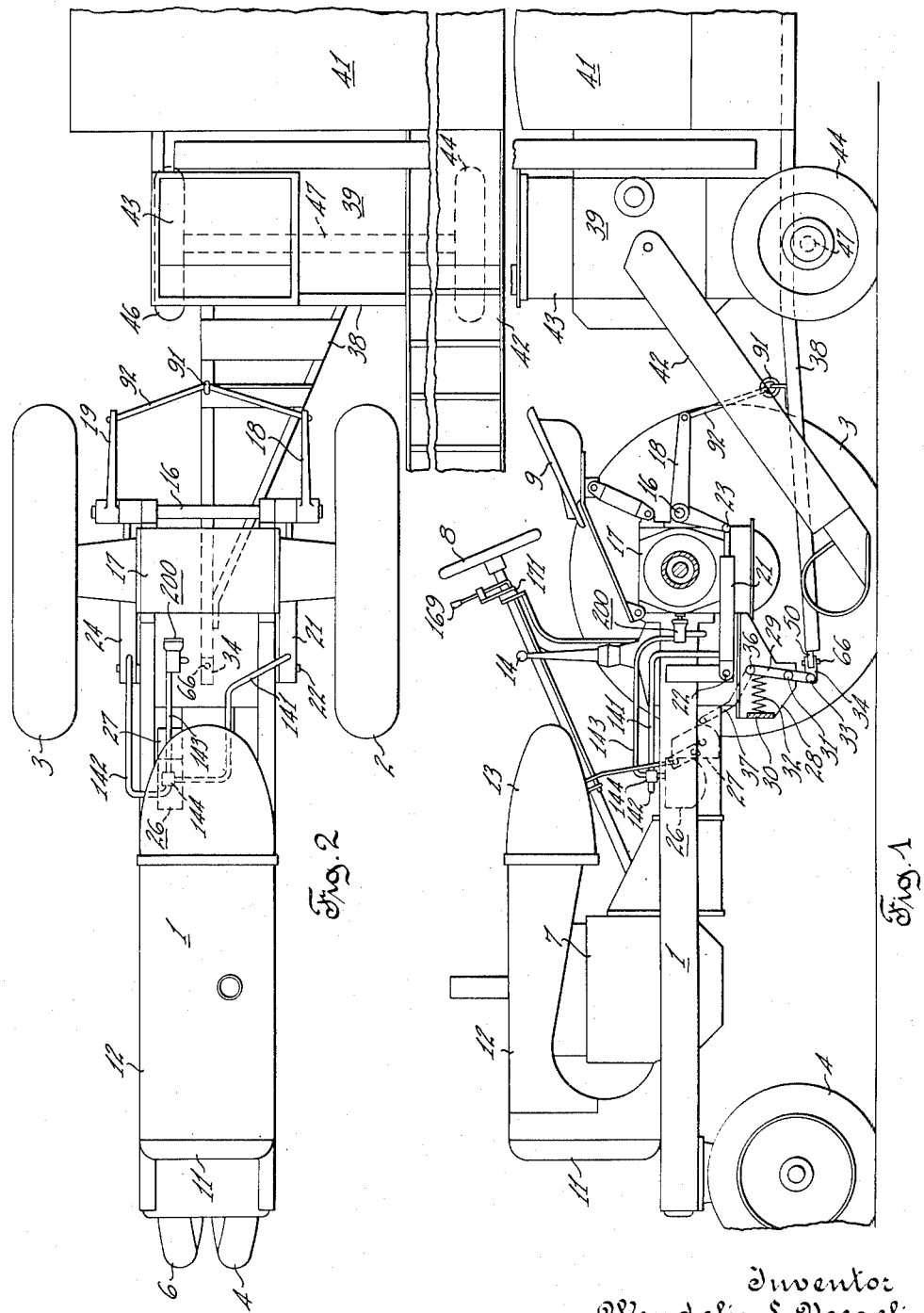

Inventor
Wendelin L. Voegeli
by
Attorney

Jan. 29, 1957  W. L. VOEGELI  2,779,604
TRACTION BOOSTING SYSTEM FOR TRACTORS
Filed July 11, 1955  4 Sheets-Sheet 4

Inventor
Wendelin L. Voegeli
by W. Gierold
Attorney

United States Patent Office 2,779,604
Patented Jan. 29, 1957

2,779,604

TRACTION BOOSTING SYSTEM FOR TRACTORS

Wendelin L. Voegeli, Milwaukee, Wis., assignor to Allis-Chalmers Manufacturing Company, Milwaukee, Wis.

Application July 11, 1955, Serial No. 521,027

6 Claims. (Cl. 280—406)

This invention relates to tractors, and it is concerned more particularly with an improved automatically operated traction boosting system, that is, with a system which will automatically function to vary the downward load on the tractor drive wheels in accordance with draft requirements.

During the past, a certain type of draft, responsive traction boosting system, as disclosed for instance in U. S. Patent 2,679,199, issued on May 25, 1954, to W. F. Strehlow, has been used extensively in connection with agricultural implements such as plows, harrows and the like, which are light enough so that they can be picked up by a lift mechanism on the tractor and carried entirely on the latter during transport without causing an objectionally large transfer of weight from the tractor front wheels to the tractor rear wheels. If too much weight were transferred from the front wheels to the rear wheels of the tractor, the tractor would no longer respond properly to steering movement of its front wheels, and an excessive lifting effort may result in rearing of the tractor upwardly on its rear wheels, as is well known in the art. The mentioned earlier traction boosting system, therefore, does not lend itself properly for use with modern relatively light but powerful tractors and with implements or other loads which are sufficiently large to take full advantage of the horespower capacity of the tractor engine but which are much too heavy for handling in the same manner in which relatively light pickup type implements have heretofore been handled by power lift systems of conventional construction.

One of the difficulties in handling relatively large and heavy implements or other loads by a powerful but relatively light tractor and an associated traction boosting power lift system is the lack of weight to counteract the tendency of the tractor front end to swing upward when additional weight is imposed upon the tractor drive wheels for traction boosting purposes. Another difficulty is presented by the hazard of the relatively heavy weight of the drawn load which would instantly swing the tractor upwardly on its drive wheels if the full power of the lift mechanism were suddenly applied to the drawn load in an attempt to boost the downward load on the tractor rear wheels or to pick up the drawn load for transport purposes. If the drawn load consists of an implement having tools which must be lifted above the ground for transport purposes, the conventional expedient of raising the entire implement and carrying it in a suspended, rearwardly overhanging condition on the tractor would not be available.

Generally, it is an object of the present invention to provide an improved traction boosting system which overcomes the hereinabove outlined difficulties in properly and safely handling a relatively heavy drawn load by a powerful but relatively light tractor.

More specifically, it is an object of the invention to provide an improved traction boosting power lift system which lends itself for use with any kind of drawn load and which automatically functions to keep the lifting force which is applied to the drawn load for traction boosting purposes at a sufficiently low value so as to prevent undue loss of steering response of the tractor front wheels and rearing of the tractor upwardly on its drive wheels by operation of the power lift mechanism.

Another object of the present invention is to provide an improved traction boosting system of the hereinabove outlined character wherein a draft load imposing structure is hitched to a tractor having a pair of rear traction wheels and a steerable support forwardly of said traction wheels, and which system will operate to apply lifting force to the draft load imposing structure in rear of the axis of the tractor drive wheels, the lifting force being automatically regulated and prevented from rising beyond a critical value so that proper response of the tractor to steering adjustments of its front support will be insured.

A still further object of the invention is to provide a traction boosting power lift system of the hereinabove outlined character, which incorporates a hydraulically operated servomotor and a hydraulic control mechanism therefor, and which will respond to variations of the tractor developed draft force to increase and decrease the traction boosting loading of the tractor rear wheels.

The foregoing and other objects and advantages are attained by the present invention, various novel features of which will be apparent from the description herein and the accompanying drawings disclosing an embodiment of the invention, and will be more particularly pointed out in the appended claims.

Referring to the drawings:

Fig. 1 is a side view of a tractor and of a semitrail type combine harvester hitched to the tractor, the near rear wheel of the tractor being omitted for purposes of exposure and the rear part of the harvester being likewise omitted;

Fig. 2 is a top view of the tractor and harvester shown in Fig. 1, portions of the harvester being broken away for purposes of simplification.

Figure 3:
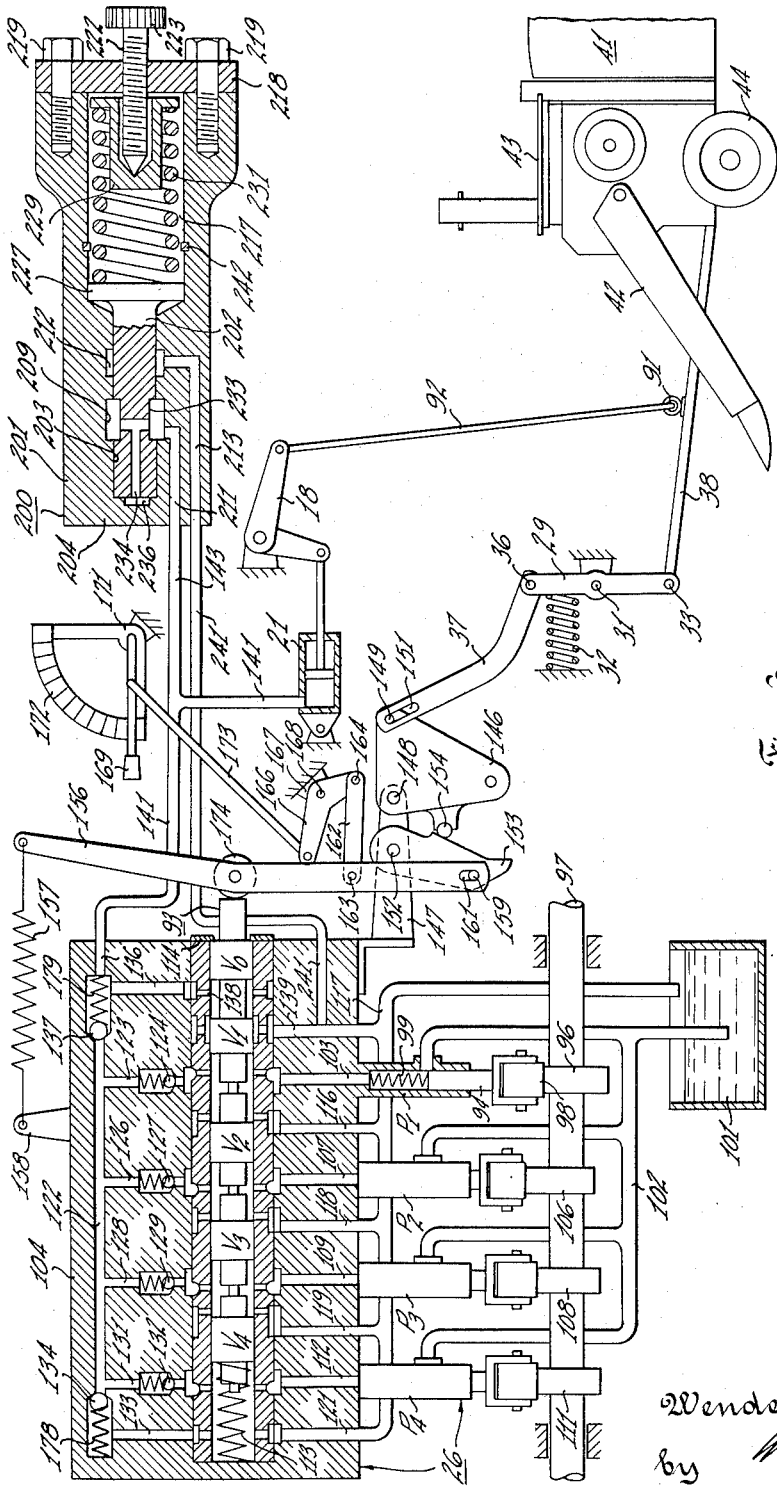
Figs. 3 to 5 inclusive, are diagrammatic views of a traction boosting system incorporated in the tractor and harvester combination shown in Figs. 1 and 2.

The tractor shown in Fig. 1 is of generally conventional construction in that its comprises a main body generally designated by the reference character 1, a pair of widely spaced rear traction wheels 2 and 3 (Fig. 2) and a pair of narrowly spaced front wheels 4 and 6.

An internal combustion engine 7 at a forward portion of the tractor furnishes power for driving the rear traction wheels 2 and 3, and a clutch, change speed transmission, differential gearing and final drive gears are provided in conformity with established practice to transmit power from the engine to the tractor drive wheels. The front wheels 4 and 6 are steerably mounted at the front end of the tractor main body 1 in conventional manner and a steering wheel 8 in front of an operator's seat 9, serves to adjust the front wheels 4 and 6 for steering purposes as desired. A radiator unit 11, hood 12, fuel tank 13 and gear shift lever 14 are arranged in their usual locations on the tractor main body.

The tractor shown in Figs. 1 and 2 is equipped with a draft responsive power lift mechanism of a type which has heretofore been used in connection with farm tractors, and the details of which are disclosed, for instance, in the hereinbefore mentioned U. S. Patent 2,679,199. Briefly, the power lift mechanism comprises a rock shaft 16 which is mounted on the rear axle housing 17 of the tractor for rotation on a horizontal, transversely extending axis and which is equipped at its opposite ends with bell crank levers 18 and 19, each having a relatively long rearwardly extending arm for connection in lift force transmitting relation with an implement at the rear of the tractor, and a relatively short downwardly extending arm for connection with a hydraulic ram. The actuating ram for the bell crank lever 18 is designated by the reference character 21 (Figs. 1 and 2) and is mounted at its barrel end on the tractor main body 1 by means of a pivot pin 22. The plunger end of the ram 21 is pivotally connected with the depending arm of the bell crank lever 18 by means of a pivot pin 23. The actuating ram for the bell crank lever 19 is generally indicated in Fig. 2 by the reference character 24 and the explanations hereinbefore with respect to the mounting of the ram 21 on the tractor and its connection with the bell crank 18 similarly apply to the mounting of the ram 24 on the tractor and its connection with the bell crank 19.

The rams 21 and 24 are connected with a pressure fluid supply system which will be explained more fully hereinbelow in connection with Figs. 3 through 5, and which includes a pump and valve unit generally designated by the reference character 26, and a control mechanism, part of which is enclosed in a housing 27 attached to the pump and valve unit 26.

A hitch mechanism for connecting a draft load imposing structure in drawn relation with the tractor is arranged at the underside of the tractor main body 1 in proximity to and forwardly of the rear axle housing 17, as best shown in Fig. 1. The hitch mechanism comprises a bracket 28 which is rigidly secured to the tractor main body; a rockable hitch lever 29 which is pivotally mounted on the bracket 28 by means of a pivot pin 31 for back and forth swinging movement on a horizontal transverse axis in vertically fixed relation to the tractor main body; and a strong coil spring 32 which is operatively interposed between the hitch lever 29 and an abutment 30 on the bracket 28 to yieldingly resist forward swinging movement of the lever 29 about the pivot pin 31. Fig. 1 shows the hitch lever 29 in a generally vertical but somewhat rearwardly inclined position and the lower end of the lever 29, below the pivot pin 31, is suitably constructed for pivotal connection with a coupling member 34. Preferably, the lower end of the hitch lever 29 is bifurcated and has a pair of transversely aligned coupling pin receiving apertures, so that the coupling element 34 may be straddled by the forked lower end of the hitch lever 29 and connected thereto for up and down swinging movement about a vertically fixed pivot center by insertion of a horizontal coupling pin 33 through the aligned apertures of the hitch lever 29 and a registering aperture in the coupling element 34. Pivotally connected to the upper end of the rockable hitch lever 29 by means of a pivot pin 36 is a reach link 37 which extends forwardly and upwardly from the hitch lever 29 and is operatively connected at its upper forward end with an element of the control mechanism enclosed in the housing 27 as will be more fully explained hereinbelow with reference to Figs. 3 through 5.

The combine harvester, as shown in Figs. 1 and 2, is of generally conventional construction in that it comprises a rigid frame assembly 38 including a forwardly extending draft tongue; a thresher mechanism of conventional construction, not shown, which is enclosed in a housing 39; a separator mechanism of conventional construction, not shown, which is enclosed in a housing 41; a header 42 pivotally mounted on the thresher housing 39; and a grain bin 43 of substantial capacity, as for instance, twenty-five bushels. A pair of ground engaging supporting wheels 44 and 46 are rotatably mounted on the frame assembly 38 by means of an axle 47 in conventional manner, and the draft tongue is supportedly connected at its forward end with the tractor for up and down swinging movement of the entire harvester as a unit about a vertically fixed pivot center, as will be explained more fully hereinbelow. In operation, the harvested material is accumulated in the grain bin 43 and periodically discharged therefrom as is customary in harvesting operations.

An eye 50 is formed on the forward end of the harvester draft tongue for engagement with a rearwardly extending portion of the coupling element 34, and a coupling pin 66 (Fig. 2) may be inserted through a vertical hole in the coupling element 34 and into the eye 50.

In order to provide for the hereinbefore mentioned lift connection between the rearwardly extending arms of the bell crank levers 18 and 19 and the harvester, a loop 91 is formed on the harvester draft tongue at a portion of the latter in rearwardly spaced relation to the vertically fixed pivot center at 33. A chain or cable 92 is passed through the loop 91, and the chain or cable 92 is anchored at one end on the rearwardly extending arm of the bell crank lever 18, and at the other end on the rearwardly extending arm of the bell crank lever 19. The length of the chain or cable 92 is such that in the position of the parts, as shown in Fig. 1, the cable will be substantially taut. As pointed out hereinbefore, the harvester is hitched to the tractor not only for vertical up and down swinging movement about the pivot center 33, but also for horizontal swinging movement about the vertical pivot pin 66 (Fig. 2). The chain or cable 92 affords a horizontally swingable lift connection between the bell crank levers 18 and 19 and the harvester. In operation, the tractor will pull the harvester through the hitch connection at 33 and 34, and when the tractor is driven to the right or left, the draft tongue of the harvester will swing from the position in which it is shown in Fig. 2, either toward the rear wheel 2 or the rear wheel 3 about the pivot pin 66, depending on the direction in which the turn is made.

The bell crank levers 18 and 19 may become subject to lifting force at any time during operation of the harvester, as will be explained more fully hereinbelow, and if the tractor is steered to the right or left while the chain or cable 92 is kept under tension by operation of the rams 21 and 24, the loop 91 may slide along the tensioned chain or cable in order to accommodate relative horizontal angular displacement of the tractor and harrow about the vertical coupling pin 66.

Referring to Fig. 3, the pump and valve unit 26 which has been mentioned hereinbefore comprises four reciprocable plunger pumps $P_1$, $P_2$, $P_3$, and $P_4$, and an axially reciprocable valve spool 93 having lands $V_1$, $V_2$, $V_3$, and $V_4$ for controlling the discharge of the pumps $P_1$, $P_2$, $P_3$ and $P_4$, respectively. The pump $P_1$ has a plunger 94 which is reciprocated back and forth by an eccentric 96 on a rotary shaft 97, the eccentric 96 bearing against a roller 98 at the lower end of the plunger 94 and a coil spring 99 being mounted in the cylinder of the pump $P_1$ to urge the plunger 94 toward the shaft 97 and thereby maintain the roller 98 in engagement with the eccentric 96. The shaft 97 forms part of the power transmitting mechanism between the engine 7 and the tractor rear wheels 2 and 3, and the arrangement is such that the shaft 97 rotates when the engine 7 is running and the master clutch of the tractor is engaged. The pump $P_1$ draws liquid, preferably oil, from a sump 101 through a branch of an inlet manifold 102 and discharges it into a passage 103 of the housing 104 for the valve spool 93. The usual check valves, not shown, are associated with the intake and outlet ports of the pump $P_1$ so that operation of the latter will continuously feed oil into the passage 103.

The foregoing explanation with respect to the pump $P_1$ similarly applies to each of the pumps $P_2$, $P_3$ and $P_4$. That is, the pump $P_2$ is operated by an eccentric 106 on shaft 97 and feeds oil into a passage 107; the pump $P_3$ is operated by an eccentric 108 on shaft 97 and feeds oil into a passage 109, and the pump $P_4$ is operated by an eccentric 111 on shaft 97 and feeds oil into passage 112.

The valve spool 93 is axially slidable back and forth in the housing 104, and a coil spring 113 at the left end of the valve spool 93 reacts between the housing 104 and the valve spool 93 so as to urge the latter toward the limit position in which it is shown in Fig. 3 and which is determined by axial engagement of a land $V_0$ of the valve spool with an end stop 114.

In the position of the valve spool, as shown in Fig. 3, the oil delivered by pump $P_1$ into the passage 103 passes from the latter through the space between the lands $V_1$ and $V_2$ into a branch 116 of the outlet manifold 117 and is returned by the latter to the sump 101. Similarly, the oil delivered by the pump $P_2$ into the passage 107 passes from the latter into the space between the lands $V_2$ and $V_3$ of the valve spool 93 into a branch 118 of the outlet manifold 117 and is returned by the latter to the sump 101. The oil delivered by the pump $P_3$ into the passage 109 passes from the latter into the space between the land $V_3$ and $V_4$ of the valve spool 93 into a branch 119 of the outlet manifold 117 and is returned by the latter to the sump 101. The oil delivered by the pump $P_4$ into the passage 112 passes from the latter into the space between the land $V_4$ and the left end wall of the valve housing 104 into a branch 121 of the outlet manifold 107 and is returned by the latter to the sump 101.

Figure 4:
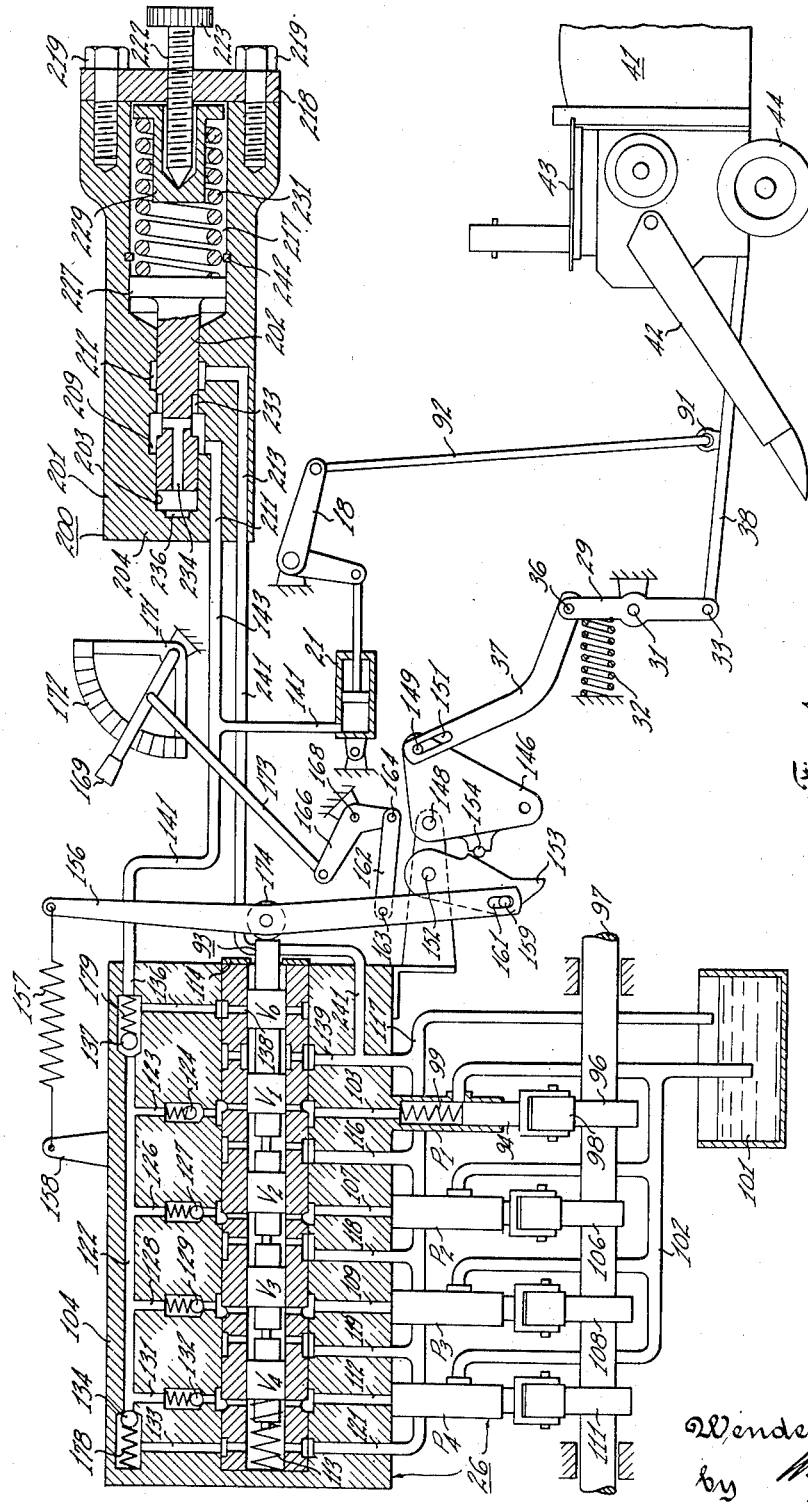
Figure 5:
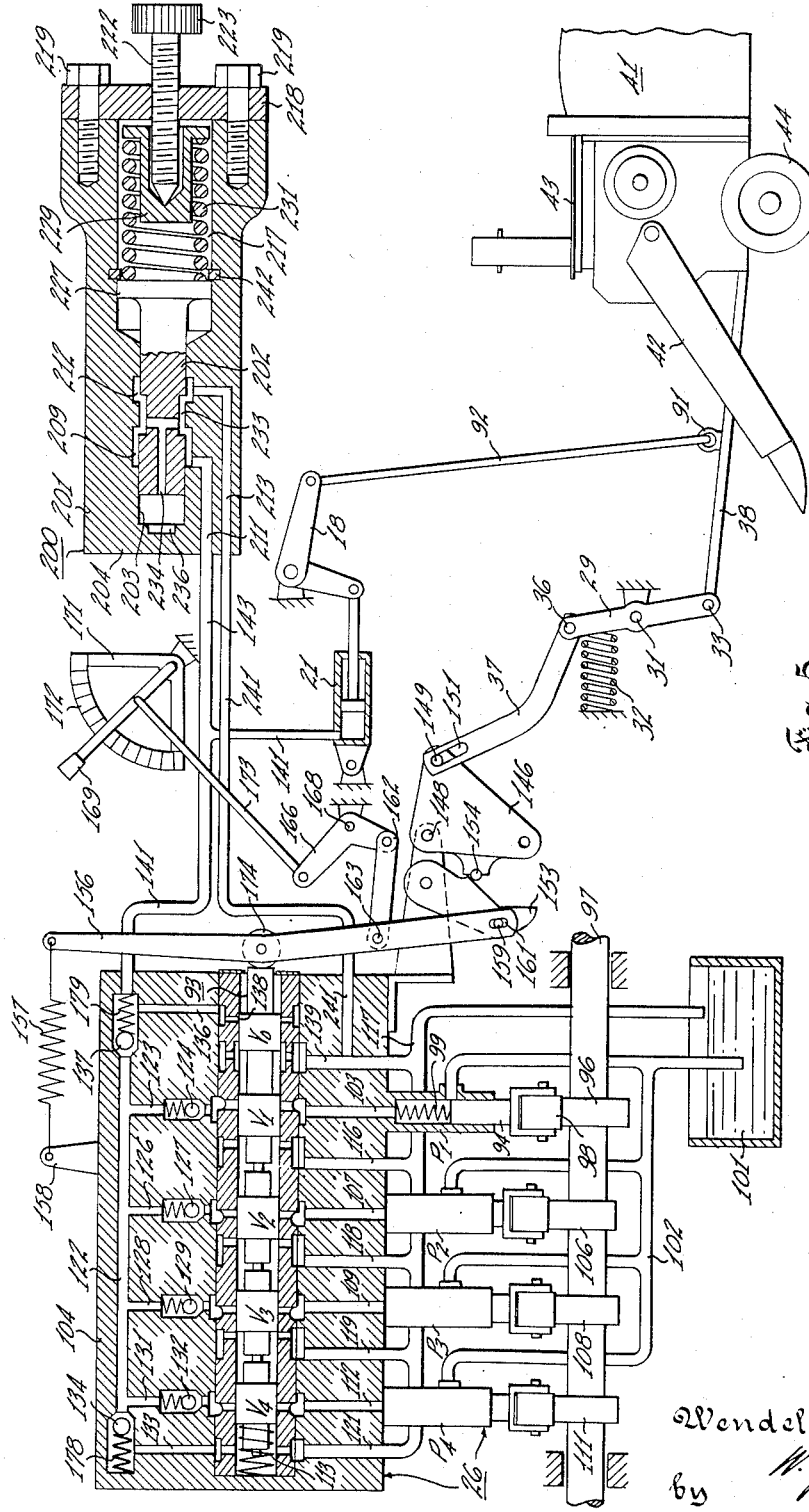

A pressure manifold 122, shown in the upper part of the valve housing 104 in each of Figs. 3, 4 and 5, has a first branch 123 which is controlled by a check valve 124 and communicates, opposite to the passage 103, with the valve chamber enclosing the valve spool 93. A second branch 126 of the pressure manifold 122 is controlled by a check valve 127 and communicates, opposite to the passage 107, with the valve chamber enclosing the valve spool 93. A third branch 128 of the pressure manifold 122 is controlled by a check valve 129 and communicates, opposite to the passage 109, with the valve chamber enclosing the valve spool 93. A fourth branch 131 of the pressure manifold 122 is controlled by a check valve 132 and communicates, opposite the passage 112, with the valve chamber enclosing the valve spool 93. A relief passage 133, which connects the left end of the chamber for valve spool 93 with the pressure manifold 122, is controlled by a check valve 134 which, as will be explained hereinbelow, serves as an unloading valve.

An internal passage 136 of the valve housing 104 at the upper right hand end of the latter, as shown in Fig. 3, has a port controlled by a check valve 137 in communication with the pressure manifold 122, and the internal passage 136 communicates with the right hand end of the chamber for the valve spool 93 through a port 138 which, as will be explained hereinbelow, is controlled by the land $V_0$. In the position of the valve spool 93, as shown in Fig. 3, the space between the lands $V_0$ and $V_1$ is in open communication with a branch 139 of the outlet manifold 117, but when the valve spool is shifted toward the left, as shown in Figs. 4 and 5, the port 138 is closed by the land $V_0$.

A conduit 141 connects the internal passage 136 of the valve housing 104 with the ram 21, as indicated diagrammatically in Fig. 3, and as shown more clearly in Figs. 1 and 2. The other ram 24 of the tractor is also connected with the internal passage 136, and a suitable connecting conduit 142 is indicated in Figs. 1 and 2. However, the tractor mounted ram 24 is not shown in the diagrammatic view of Fig. 3 because the rams 21 and 24 are in effect connected in parallel relation with each other, and for practical purposes, act as a single fluid motor.

A pressure responsive valve generally designated by the reference character 200, and more fully described hereinbelow in connection with Figs. 3, 4 and 5, is connected with the internal passage 136 of the valve housing 104 in parallel with the rams 21 and 24, and this is schematically indicated in Fig. 3 by a conduit 143 which leads from the valve 200 into the conduit 141. In Figs. 1 and 2 the conduit 143 is shown as being connected to a fitting 144 on the tractor which serves to establish communication between the internal passage 136 (Fig. 3) of the valve housing 104 with the conduit 143 (Fig. 2) and with the conduits 141 and 142 (Fig. 2).

Referring to Fig. 3, the pressure responsive valve 200 comprises a stationary valve housing 201 and an axially movable valve spool 202. The spool 202 is reciprocably fitted into a cylindrical bore 203 of the housing 201, the bore 203 being covered at one end by an end wall 204 of the valve housing 201. The bore 203 is radially enlarged by an annular groove 209 which communicates with an inlet passage 211; and another annular groove 212, which forms another radial enlargement of the bore 203, communicates with a relief passage 213.

The bore 203 of the valve housing 201 merges with an axially extending, radially enlarged recess 217, and a head plate 218 is secured to the valve housing 201, by means of cap screws 219, in covering relation to the recess 217. A thumb screw 222, which has a knurled knob 223 outside of the valve housing 201, has screw threaded engagement with an internally threaded bore of the head plate 218.

Within the recess 217 of the valve housing 201 a thimble 229 extends axially over an adjacent end portion of the thumb screw 222. A relatively strong coil spring 231 bears against a disk head 227 of the valve spool 202, and reacts against a radially outward extending flange of the thimble 229 so as to urge the latter against a pointed end portion of the thumb screw 222.

In the condition of the valve 200, as shown in Fig. 3, the thumb screw 222 is adjusted to a position in which the spring 231 is effective to urge the valve spool 202 axially against the end wall 204 of the housing 201.

The valve spool 202 has a circumferential groove 233 which is of sufficient axial length so as to register with the groove 209 of the valve body 201 in all axially adjusted positions of the valve spool 202, as illustrated by Figs. 3, 4 and 5. The circumferential groove 233 of the valve spool communicates with an axial bore 234 of the spool 202, and a shallow recess 236 is formed in the end wall 204 opposite the adjacent open end of the axial bore 234.

The width and location of the groove 233 of the valve spool 202, and the width and location of the grooves 209 and 212 of the valve housing 201 are such that the inlet passage 211 is out of communication with the outlet passage 213 when the valve spool is in the position of maximum axial displacement to the left as shown in Fig. 3, and so that the inlet passage 211 remains out of communication with the outlet passage 213 when the valve spool 202 is displaced a short distance to the right as shown in Fig. 4. When the valve spool 202 is displaced a substantial distance to the right as shown in Fig. 5, the annular groove 233 of the valve spool 202 establishes substantially unrestricted communication between the inlet passage 211 and the outlet passage 213. A conduit 214 connects the discharge passage 213 of the valve 200 with the branch 139 of the outlet manifold 117 and through the latter with the sump 101.

The hitch lever 29 is shown in Fig. 3 in a more forwardly tilted position than in Fig. 1, and the spring 32 is shown in a correspondingly compressed condition in which it strongly but yieldingly opposes further forward swinging movement of the lever 29 about the pivot center 31. The upper end of the lever 29 is pivotally connected with the reach link 37, and the statement has been made hereinbefore that the reach link 37 is operatively connected at its upper forward end with an element of the control mechanism enclosed in the housing 27. The mentioned control mechanism is diagrammatically indicated in Fig. 3 and comprises a generally triangular rocker 146 which is pivotally supported on a stationary bracket 147 by means of a pivot pin 148. The rocker 146 carries a stud 149 which projects into a slot 151 of the reach link 37. The stud 149 and slot 151 form a lost motion connection between the reach link 37 and the triangular rocker 146, and in the condition of the mechanism as shown in Fig. 3, the stud 149 is engaged by the upper end of the slot 151 so that the rocker will be prevented from anticlockwise movement, as viewed in Fig. 3 about the pivot pin 148 as long as the hitch lever 29 is in the indicated position.

Pivotally mounted on the bracket 147 by means of a pivot pin 152 is a secondary rocker 153 which bears at one side against a lug 154 on the triangular rocker 146. The secondary rocker 153 is biased anticlockwise, as viewed in Fig. 3, into engagement with the lug 154 by means of a floating lever 156 and a coil spring 157 which is operatively interposed between the upper end of the floating lever 156 and a bracket portion 158 of the valve housing 104 so as to urge the upper end of the floating lever 156 toward the left in Fig. 3.

The floating lever 156 has a pin and slot connection at its lower end with the secondary rocker 153, a pin 159 being secured to the secondary rocker 153 and extending through a slot 161 in the lower end of the floating lever 156. A hand operated mechanism for moving the floating lever 156 back and forth about its connection with the secondary rocker 153 comprises a link 162 which is pivotally connected at one end to the lever 156 by means of a pivot pin 163 and at its other end by means of a pivot pin 164 to a bell crank lever 166. The bell crank lever 166 is pivotally supported at its fulcrum on a stationary bracket 167 by means of a pivot pin 168 and adjustment of the bell crank lever about the pivot pin 168 may be effected by means of a hand lever 169 shown in the upper part of Fig. 3 and also in proximity to the steering wheel 8 in Fig. 1. The hand lever 169 is pivotally mounted on a suitable support 171 mounted on the steering column of the tractor, the support 171 including quadrant 172 along which the hand lever 169 may be moved to the various positions in which it is shown in Figs. 3, 4 and 5. A suitable detent mechanism, not shown, is provided for releasably retaining the hand lever 169 in any position of adjustment along the quadrant 172. Pivotal movement of the hand lever 169 about its pivot center on the bracket 171 is transmitted to the bell crank lever 166 by means of suitable linkage diagrammatically represented in Fig. 3 by the link 173. Upward adjustment of the hand lever 169 from the position in which it is shown in Fig. 3 causes clockwise movement of bell crank lever 166 about its pivot center 168, and corresponding anticlockwise movement of floating lever 156 about pivot pin 159 on secondary rocker 153. The floating lever 156 is arranged in such relation to the reciprocable valve spool 93 that the latter may be moved to the left in opposition to the action of the spring 113 by movement of the floating lever 156 toward the left from the position in which it is shown in Fig. 3, the lever 156 having a suitable contact boss 174 for cooperative engagement with the right end face of the valve spool 93.

The principal purpose of the herein disclosed hydraulic system is to transfer weight from the harvester to the rear wheels of the tractor when such weight transfer becomes desirable in order to keep the tractor moving under severe operating conditions. The principal advantage of the system resides in the fact that it provides for handling of a relatively large and heavy implement by a powerful tractor whose weight to horsepower ratio is relatively small. For example, the tractor may have an engine which is capable of developing 45 horsepower but the operating weight of the tractor may only be about 4700 pounds. Assuming that the general overall construction of the tractor conforms with accepted practice, the normal load carried by the rear wheels 2 and 3 would be about seventy percent of the total tractor weight, that is, about 3300 pounds, and the normal load carried by the front wheels 4 and 6 of the tractor would be about thirty percent of the total tractor weight or about 1400 pounds. On the other hand, the harvester may be assumed to have a total net weight of about 3000 pounds and may carry an additional load of roughly 1000 pounds in the grain bin 43. That is, the weight of the harvester, particularly when the bin is loaded, may be such that the normal vertical load on the tractor rear wheels of about seventy percent of the total tractor weight would be inadequate to afford the necessary grip of the tractor drive wheels for advancing the harvester under the difficult conditions which are frequently encountered in harvester operations.

Another problem presented by the assumed circumstances is the danger of the tractor front end to swing upward about the rear wheel axis of the tractor if an attempt were made to lift the harvester by operation of the tractor mounted rams 21 and 24.

The provision of the herein disclosed traction boosting system avoids these difficulties, that is, it insures adequate grip of the tractor drive wheels to utilize the full power of the engine for propulsion purposes; and it eliminates the hazard presented by the tractor swinging up rearwarly about the axis of the tractor rear wheels.

Considering first the operating condition of the system illustrated by Fig. 3, it will be noted that the hand lever 169 is adjusted to its extreme downward or implement lowering position, and that the spring 32 is in a state of substantial compression due to the development of considerable draft force by the tractor. Forward swinging of the lever 29 from the position in which it is shown in Fig. 1 to that in which it is shown in Fig. 3 is transmitted to the reach link 37 and, as a result, the triangular rocker 146 will turn in anticlockwise direction to a limited extent about its pivot pin 148 under the bias to which it is subjected by the control spring 157 which tends to swing the floating lever 156 about its pivot center 163 and acts through the pin and slot connection 159, 161 to swing the second rocker 153 and the triangular rocker 146 in anticlockwise direction about their respective pivot pins 152 and 148.

For purposes of explanation it may be assumed that the forward pull which is required to advance the harvester with the spring 32 compressed as shown in Fig. 3, exceeds the drawbar pull which the tractor is able to develop under its normal rear wheel load of about 3300 pounds. That is, if the normal downward load on the rear wheels of the tractor is seventy percent of the total tractor weight, as mentioned hereinbefore, application of the full driving torque of the engine to the tractor rear wheels will cause the tractor wheels to slip and consequently the advance movement of the tractor will slow down or possibly stop altogether. The system, and particularly the coil spring 32, are so designed that when the hand lever 169 is in its fully lowered position as shown in Fig. 3 and the drawbar load reaches the point where the tractor wheels begin to slip, as explained hereinbefore, the floating lever 156 will assume a position approximately as indicated in Fig. 3, that is, a position in which the contact boss 174 is just about ready to engage the right end of the valve spool 93 while the latter is in the limit position in which it is shown in Fig. 3. When the operator notices that the tractor slows down due to wheel slippage he may increase the grip of the tractor rear wheels by simply moving the hand lever 169 upward from its implement lowering to an intermediate or weight transfer position such as indicated, for instance, in Fig. 4.

Comparing Fig. 4 with Fig. 3, it will be noted that upward adjustment of the hand lever 169 from its implement lowering position, while the hitch lever 29 is in a forwardly adjusted position and the spring 32 is appreciably loaded due to heavy drawbar pull of the tractor, causes the floating lever 156 to swing to the left in Fig. 4 about the pivot pin 159 on the secondary rocker 153 so as to move the valve spool 93 to an adjusted position, as illustrated in Fig. 4. In this position the port 138 of the internal passage 136 is closed by the land $V_0$ of the valve spool 93 and the land $V_1$ of the valve spool 93 has moved into a position which prevents the oil discharge from pump P₁ to pass into the branch 116 of the outlet manifold 117. Not being able to return to sump, the oil discharged from pump P₁ unseats the check valve 124 and builds up pressure in the pressure manifold 122. Continued delivery of oil from pump P₁ into the pressure manifold 122 unseats the check valve 137 and causes passage of pressure fluid through the conduits 141 and 142 into the rams 21 and 24, and through the conduit 143 into axial bore 234 of the valve spool 202. When fluid pressure builds up in the axial bore 234, the valve spool 202 becomes subject to an axial thrust which tends to move it toward the end plate 218, and such axial thrust is opposed by the coil spring 231 which tends to retain the valve spool in the position in which it is shown in Fig. 3.

Fig. 4 shows the spool 202 of the distributor valve 200 in a position of axial displacement toward the end plate 218, and the yielding characteristic of the spring 231 is such that a fluid pressure of considerable magnitude is required in the pressure manifold 122, conduits 141, 142, 143, and axial bore 234 in order to effect an axial shift of the valve spool 202 from the position in which it is shown in Fig. 3 to the position in which it is shown in Fig. 4. Since this pressure also acts upon the rams 21 and 24 and thereby becomes effective to impose a traction boosting additional load upon the tractor rear wheels 2 and 3 by means of the bell crank levers 18, 19 and the chain or cable 92, it will hereinafter be termed the traction boosting line pressure of the system. Under the conditions illustrated by Fig. 4 this line pressure is built up by operation of the pump P₁ and is communicated to the rams 21 and 24, but not to the discharge passage 213, the latter being closed by the valve spool 202.

As the pressure in the pressure manifold 122 rises, the downward load component which is transmitted to the ground by the harvester wheels 43 and 44 becomes progressively smaller and a correspondingly increasing load becomes effective upon the tractor rear wheels. The downward load which is imposed under these circumstances upon the rearwardly extending arms of the bell crank levers 18 and 19 by the cable or chain 92 is opposed by the weight component of the tractor which acts downwardly upon the front wheels 4 and 6. In order to preserve proper steering response of the tractor, the front wheels should remain subject to a substantial load at all times, but in actual practice it has been found that a considerable amount of the normal downward load on the front wheels may be transferred to the rear wheels for traction boosting purposes without adversely affecting the steering response of the front wheels. If the harvester has a total weight of 4000 pounds and the normal front wheel loading of the tractor is about 1400 pounds as has been assumed hereinbefore, it would be entirely practical for traction boosting purposes to transfer as much as a total load of 1100 pounds to the tractor rear wheels by operation of the rams 21 and 24, part of this total load being taken from the harvester and another part from the tractor front wheels.

The amount of weight which will be automatically transferred from the tractor front wheels to the tractor rear wheels increases and decreases in accordance with any increase or decrease of the traction boosting line pressure, and the pressure responsive valve 200 automatically functions to limit said line pressure to a safe predetermined value. This is accomplished by proper proportioning of the valve 200 and particularly of the spring 231, as will become more fully apparent from the explanations hereinbelow with reference to Fig. 5. The thumb screw 222 may be manipulated so as to adjust the valve 200 for operation at a higher or lower maximum traction boosting line pressure, or if desired, to lock the valve spool 202 against axial displacement in either direction from the position in which it is shown in Fig. 3.

While the system is in the condition as illustrated in Fig. 4, four major downward load components are effective upon the rear wheels of the tractor, namely, first, the normal part of the total tractor weight which, as explained hereinbefore, may approximate seventy percent of the total operating weight of the tractor; second, the weight component originating from that part of the harvester weight which is carried on the hitch lever 29 without traction boosting; third, the weight component transferred from the harvester by the rams 21, 24; and fourth, a portion of the normal front wheel load such as ten percent of the total tractor weight.

When the tractor is operated to advance the harvester in the condition as illustrated by Fig. 4, with the hand lever 169 adjusted as shown to a weight transfer position, the drawbar pull of the tractor may increase or decrease as the harvester encounters various conditions of resistance against propulsion. Should the resistance increase, the spring 32 will be further compressed and, as a result, the valve spool 93 will be moved further to the left with the result that the pump P₂ and possibly pumps P₃ and P₄ may start delivering pressure fluid into the pressure manifold 122, to the rams 21, 24 and to the valve 200.

When a condition of excessive draft load is encountered while the hand lever 169 is in the weight transfer or traction boosting position in which it is shown in Fig. 4, the system will function automatically to prevent upward swinging of the tractor and consequent loss of steering response. This is illustrated by Fig. 5. As distinguished from Fig. 4, Fig. 5 shows the main valve spool 93 in its limit position of axial displacement to the left to which it is moved automatically by anticlockwise movement of the floating lever 156 about the pivot pin 163 under the action of the control spring 156, when the hitch lever 29 swings forward against the yielding resistance of the spring 32 under an excessive draft load. In that event all four pumps P₁, P₂, P₃ and P₄ will deliver pressure fluid into the pressure fluid manifold 122, and the traction boosting line pressure which acts upon the rams 21 and 24, and upon the spool 202 of the valve 200 will quickly attain a sufficiently high value so as to force the valve spool 202 to the limit position in which it is shown in Fig. 5, and which is determined by axial engagement of the spool head 227 with a snap ring 242 in the recess 217 of the valve housing 201.

Movement of the valve spool 202 to the limit position in which it is shown in Fig. 5 connects the discharge passage 213 with the inlet passage 211 of the valve housing 201 by movement of the annular groove 233 into communication with the annular groove 212. As a result, the fluid which is discharged from the pumps P₁, P₂, P₃ and P₄ and built up to the predetermined traction boosting line pressure will be passed through the conduit 241 and outlet manifold 117 into the sump 101.

The condition of the system as illustrated by Fig. 5 may be assumed to exist only for limited times, because the draft requirements of the harvester will change continuously during normal operations. Decrease of the draft force which is transmitted from the tractor to the harvester may reach the point where the spring 32 would swing the hitch lever 29 from the forwardly inclined position in which it is shown in Fig. 5 to the rearwardly inclined position in which it is shown in Fig. 1, while the hand lever 169 remains in the traction boosting position in which it is shown in Figs. 4 and 5. As a result of such rearward swinging of the hitch lever 29 the floating lever 156 would be forced to swing about the pivot pin 163 in clockwise direction and in opposition to the action of the control spring 157. Such clockwise swinging of the floating lever would permit the valve spool 93 to assume the position in which it is shown in Fig. 3 and in which the port 138 is uncovered by the land V₀, so that any pressure which may have been built up in the rams 21, 24 and in the bore 234 of the valve 200 will be fully released. Such pressure release immediately relieves the tractor rear wheels of the traction boosting load to which they are subjected while the system is in the Fig. 5 condition, and the pressure release also causes the valve spool 202 of the valve 200 to be moved into the position in which it is shown in Fig. 3 by the action of the spring 231.

From the foregoing explanations it will be apparent that the system operates automatically to impose a traction boosting additional load on the tractor rear wheels only when needed, and that the tractor rear wheels are automatically relieved of such additional loading when it is no longer required. When the hand lever 169 has been adjusted to a weight transfer position, such as shown for instance in Figs. 4 and 5, and if the lever is then left in that position, the system will operate automatically to transfer more or less weight from the harvester to the tractor as required by changing conditions of draft requirements.

Referring once more to Fig. 5, the ball or other closure element of the check valve 134 at the upper left hand corner of said figure is urged upon its seat by a spring 178, and the ball of the check valve 137 is urged upon its seat by a spring 179 which is so proportioned that the check valve 137 opens at a much lower pressure in the manifold 122 than the check valve 134. The purpose of the check valve 137 is to suppress kickback of pressure from the rams into the pumps, and the spring 179 is relatively weak so as to yield readily when fluid pressure builds up in the manifold 122. The check valve 134, on the other hand, is designed so as to open only at a relatively high pressure, that is, at a pressure higher than that which is required to move the spool 202 of the valve 200 in opposition to the action of the coil spring 231 from its Fig. 3 position to its Fig. 5 position. A representative value of the fluid pressure required to open the check valve or unloader valve 134 would be 3500 pounds per square inch (p. s. i.), and a representative value of the fluid pressure required to move the spool 202 of the valve 200 from its Fig. 3 position to its Fig. 5 position would be 975 p. s. i. The tractor mounted rams 21 and 24 and associated lift connections with the harvester are so proportioned that the critical value of the traction boosting line pressure (975 p. s. i.) at which the valve 200 assumes its Fig. 5 position, will effect the maximum weight transfer from the harvester and from the tractor front wheels to the tractor rear wheels, which can be tolerated without jeopardizing proper steering response of the tractor front wheels. In other words, the traction boosting line pressure may rise up to the mentioned critical value, but when it reaches it, the system functions automatically to prevent further rise and consequent loss of steering response of the tractor and possible upward swinging of the tractor front end about the axis of the tractor rear wheels.

The automatic functioning of the system which limits the amount of weight transfer from the tractor front wheels to the tractor rear wheels will readily be apparent from an inspection of Fig. 5. As shown in that figure, the spool 202 of the valve 200 is in a condition of axial adjustment which places the sump line 241 into communication with the tractor rams 21 and 24. Under these circumstances, any rise of the traction boosting line pressure beyond the mentioned critical value (975 p. s. i.) would immediately be suppressed by diversion of the pump discharge into the sump 101. Such diversion of the pump discharge would also be effected, if the hand lever 169 should be moved to its limit of upward adjustment, because such adjustment would positively move the valve spool 93 to the position in which it is shown in Fig. 5, independently of the hitch lever 29.

The thumb screw 222 may be used to disable the valve 200 by locking the plunger 202 in the position of maximum axial displacement toward the end cover 204, in which it is shown in Fig. 3, and in which the outlet passage 213 of the valve is closed. Operating conditions under which it would be desirable to lock out the pressure responsive valve 200 by means of the thumb screw 222 may arise when the pump and valve unit 26 on the tractor is to be used in connection with a relatively light pickup type implement, or for simple hydraulic remote control of a trailing implement without weight transfer and traction boosting.

In general terms the hitch lever 29, coupling elements 33, 34 and 66 represent articulated hitch means which operatively connect the harvester with the tractor for up and down swinging movement relative thereto about a vertically fixed pivot center at 33; and the hitch lever 29 represents a back and forth movable yielding biased draft transmitting element. The hydraulic rams 21 and 24 when considered as a unit represent a servomotor or fluid motor which is mounted on the tractor and operatively connected in lift force transmitting relation with a mobile structure as represented by the harvester. Actuating means for the fluid motor comprise a source of fluid, as represented by pumps $P_1$ through $P_4$, a main valve which is operatively associated with that source and has a movable fluid control element, as represented by the valve spool 93, such fluid control element being selectively operable to either direct pressure fluid from said source into a manifold, such as the manifold 122, which is connected with the fluid motor, or to emit pressure fluid from said manifold into a sump. The system further includes a pressure responsive valve 200 which has an inlet passage 211 connected with said manifold, a discharge passage 213 connected with said sump, and a movable fluid control element 202 operable to connect said inlet passage with said discharge passage upon rise of the fluid pressure in the manifold to a predetermined value (975 p. s. i.), and so as to disconnect said inlet passage from said discharge passage as long as the pressure in the manifold is below that predetermined value. Motion transmitting means which include the reach link 37, rockers 146 and 153 and the floating lever 156 are operatively interposed between the back and forth movable draft transmitting element 29 and the main valve for admitting pressure fluid into and emitting pressure fluid from said manifold by operation of the main valve in response to increases and decreases, respectively, of the draft transmitted from the tractor to the harvester or mobile structure. Manually adjustable control means, as represented by the hand lever 169 and associated links 173, 166 and 162, are operable to adjust the fluid control element 93 of the main valve for delivery of pressure fluid from the source $P_1$, $P_2$, $P_3$ and $P_4$ into the manifold 122 and for emission of pressure fluid from said manifold into the sump 101 independently of the back and forth movable draft transmitting element 29.

The frame assembly 38 of the combine harvester is vertically rigid and pivotally supported on running gear 44 for up and down swinging movement of a forward portion of the frame assembly relative to the ground. The weight component of the tractor which, in the condition of the system as shown in Fig. 1, is carried by its steerable front support and the weight component of the harvester which is carried on the harvester wheels 44 are relatively proportioned so that transfer of the entire last mentioned weight component to the tractor by operation of the hydraulic rams 21, 24 and associated lift mechanism 18, 92 would cause upward and rearward swinging of the tractor on its rear wheels 2 and 3. The pressure responsive valve 200 represents means operatively connected with the rams 21, 24 for limiting the progressively increasing ram energizing fluid pressure and, consequently, the lifting force exerted upon the combine harvester, so as to prevent said upward and rearward swinging of the tractor.

It should be understood that it is not intended to limit the invention to the herein disclosed forms and details of construction and that the invention includes such other forms and modifications as are embraced by the scope of the appended claims.

It is claimed and desired to secure by Letters Patent:

1. In combination with a tractor and an attached draft load imposing structure having a ground engaging support, a traction boosting system comprising a servomotor mounted on the tractor and connected in lift force transmitting relation to said attached structure so that transmission of lifting force from said tractor to said structure by operation of said servomotor will cause transfer of weight from said structure and from a steerable front support of said tractor to drive wheels of the latter mounted rearwardly of said front support, actuating means for said servomotor including a control mechanism responsive to variations of draft force transmitted from said tractor to said attached structure so as to progressively increase said lift force upon progressive increase of said draft force and so as to progressively decrease said lift force upon progressive decrease of said draft force, the weight component of said tractor carried by said front support and the weight component of said draft load imposing structure carried by said ground engaging support being relatively proportioned so that transfer of the entire last mentioned weight component to said tractor by operation of said servomotor would cause upward and rearward swinging of said tractor on said rear wheels, and means operatively associated with said servomotor for limiting said progressively increasing lift force so as to prevent said upward and rearward swinging of said tractor.

2. In combination with a tractor and an attached draft load imposing structure having a ground engaging support, a hydraulically operated traction boosting system comprising a tractor mounted fluid motor connected in lift force transmitting relation with said draft load imposing structure so that transmission of lifting force from said tractor to said attached structure by operation of said fluid motor will cause transfer of weight from said structure and from a steerable front support of said tractor to drive wheels of the latter mounted rearwardly of said front support; a pressure manifold connected in fluid delivering relation with said tractor mounted fluid motor; a pressure responsive valve having an inlet passage connected with said manifold and a discharge passage connected with a sump; and pressure fluid supply means including a control mechanism responsive to variations of draft force transmitted from said tractor to said attached structure so as to place said manifold, fluid motor and valve under a fluid pressure which increases and decreases in accordance with increases and decreases, respectively, of said draft forces; the weight component of said tractor carried by said front support and the weight component of said draft load imposing structure carried by said ground engaging support being relatively proportioned so that transfer of the entire last mentioned weight component to said tractor by operation of said fluid motor would cause upward and rearward swinging of said tractor on said rear wheels, and said pressure responsive valve including a movable fluid actuated control element operative to disconnect said inlet passage from said discharge passage so as to energize said fluid motor by said pressure fluid supply means, and to connect said inlet passage with said discharge passage before said fluid pressure increases sufficiently to cause said upward and rearward swinging of said tractor.

3. In combination, a tractor, an attached draft load imposing structure, and a traction boosting system as set forth in claim 2 and further comprising a resilient element operatively associated with said movable control element of said pressure responsive valve so as to bias said element toward a position in which it disconnects said inlet passage from said discharge passage; and an adjusting mechanism operatively associated with said resilient element for varying the biasing force acting upon said movable control element.

4. In combination, a tractor, an attached draft load imposing structure, and a traction boosting system as set forth in claim 3 and further comprising an unloader valve connected in fluid receiving relation with said manifold and operative to connect the latter in fluid delivering relation with said sump upon rise of said fluid pressure in said manifold to a value substantially higher than that at which said pressure responsive valve becomes operative to connect said inlet passage thereof with said discharge passage.

5. In combination, a tractor, a mobile structure having a vertically rigid frame pivotally supported on running gear for up and down swinging movement of a forward portion of said frame relative to the ground, articulated hitch means supporting said forward frame portion on said tractor for up and down swinging movement of said frame and running gear about a vertically fixed pivot center on said tractor and including a back and forth movable yieldingly biased draft transmitting element; a fluid motor mounted on said tractor and operatively connected in lift force transmitting relation with said frame; and actuating means for said fluid motor comprising a source of fluid pressure, a main valve operatively associated with said source and having a movable fluid control element selectively operable to either direct pressure fluid from said source into a manifold connected with said fluid motor or to emit pressure fluid from said manifold into a sump; a pressure responsive valve having an inlet passage connected with said manifold, a discharge passage connected with said sump, a movable fluid actuated control element operable in one position of adjustment thereof to disconnect said inlet passage from said discharge passage and displaceable by rise of the fluid pressure in said manifold to another position in which it connects said inlet passage with said discharge passage, and resilient means yieldingly urging said fluid control element into said one position thereof; manually adjustable means for varying the pressure of said resilient means upon said control element; motion transmitting means operatively interposed between said back and forth movable draft transmitting element and said main valve for admitting pressure fluid into and emitting pressure fluid from said manifold by operation of said main valve in response to increases and decreases, respectively, of the draft transmitted from said tractor to said mobile structure; and manually adjustable control means operable to adjust said fluid control element of said main valve for delivery of pressure fluid from said source into said manifold and for emission of pressure fluid from said manifold into said sump independently of said back and forth movable draft transmitting element.

6. The combination recited in claim 5 and further comprising, means operatively associated with said pressure responsive valve for releasably securing said fluid control element of said pressure responsive valve against movement from said one adjusted position in which it is operative to disconnect said inlet passage of said pressure responsive valve from said discharge passage; and an unloader valve associated with said manifold and operative to connect the latter in fluid delivering relation with said sump upon rise of the fluid pressure in said manifold while said fluid control element of said pressure responsive valve is secured in said one adjusted position.

References Cited in the file of this patent

UNITED STATES PATENTS

| | | |
|---|---|---|
| 2,095,876 | Johnston | Oct. 12, 1937 |
| 2,347,898 | Ferguson | May 2, 1944 |
| 2,459,098 | Simmons | Jan. 11, 1949 |
| 2,667,745 | Smith et al. | Feb. 2, 1954 |
| 2,679,199 | Strehlow | May 25, 1954 |